May 18, 1937.  D. COMETTO ET AL  2,080,603
SAFETY BRAKE FOR AUTOMOBILES, AGAINST THEFT OF THE SAME
Filed Sept. 4, 1934  2 Sheets-Sheet 1
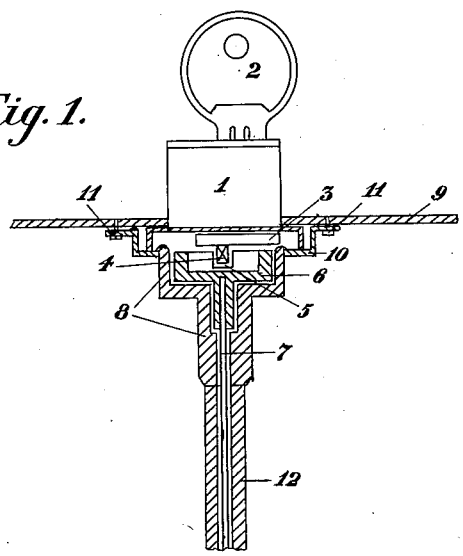
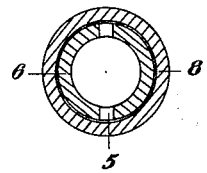
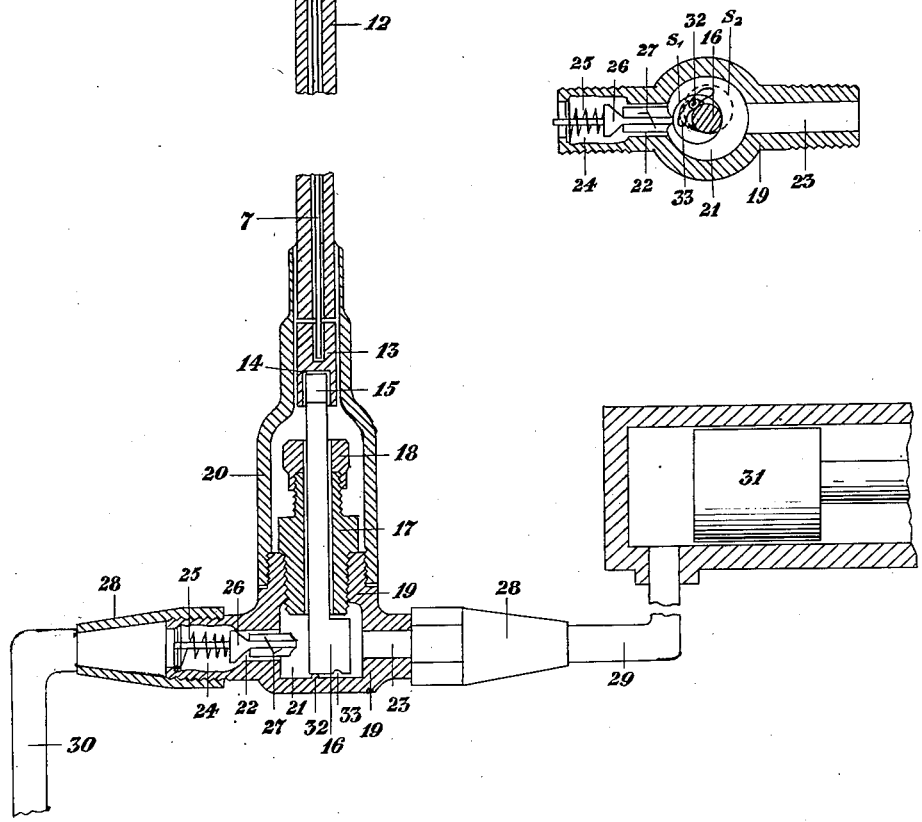
INVENTORS:
D. Cometto & J. Cometto
BY Marks & Clerk
ATTORNEYS.

Patented May 18, 1937

2,080,603

UNITED STATES PATENT OFFICE 2,080,603

SAFETY BRAKE FOR AUTOMOBILES, AGAINST THEFT OF THE SAME

Domingo Cometto and Juan Cometto, Buenos Aires, Argentina

Application September 4, 1934, Serial No. 742,684

2 Claims. (Cl. 188—265)

This invention relates to a safety brake for automobiles with the object of avoiding the theft of these vehicles and which acts by automatic braking of the wheels of same.

Its simple construction makes possible the arrangement in any class of automobile, either being the same of those bearing hydraulic brakes or of those of the type furnished with rod brakes.

As the apparatus constituting the safety brake of our invention requires a little modification according to whether the application is made to an automobile with hydraulic brakes or to an automobile with rod brakes, hereunder we shall make a description of the apparatus to be applied to an automobile with hydraulic brakes and then we shall describe the necessary modification of the apparatus to apply it to a vehicle with rod brakes.

The purposes and advantages of this invention will become apparent as the description proceeds.

Referring to the accompanying drawings which are made a part hereof and in which similar reference characters indicate similar parts, Fig. 1 is a sectional view of the device of our invention, applicable to automobiles with hydraulic brakes.

Fig. 2 is a plan view of a part of the mechanism operating a wire which in its turn operates the valve system comprising our invention.

Fig. 3 is a diagrammatic illustration of the several positions taken by the piece which operates directly upon the valve system.

Figure 4:
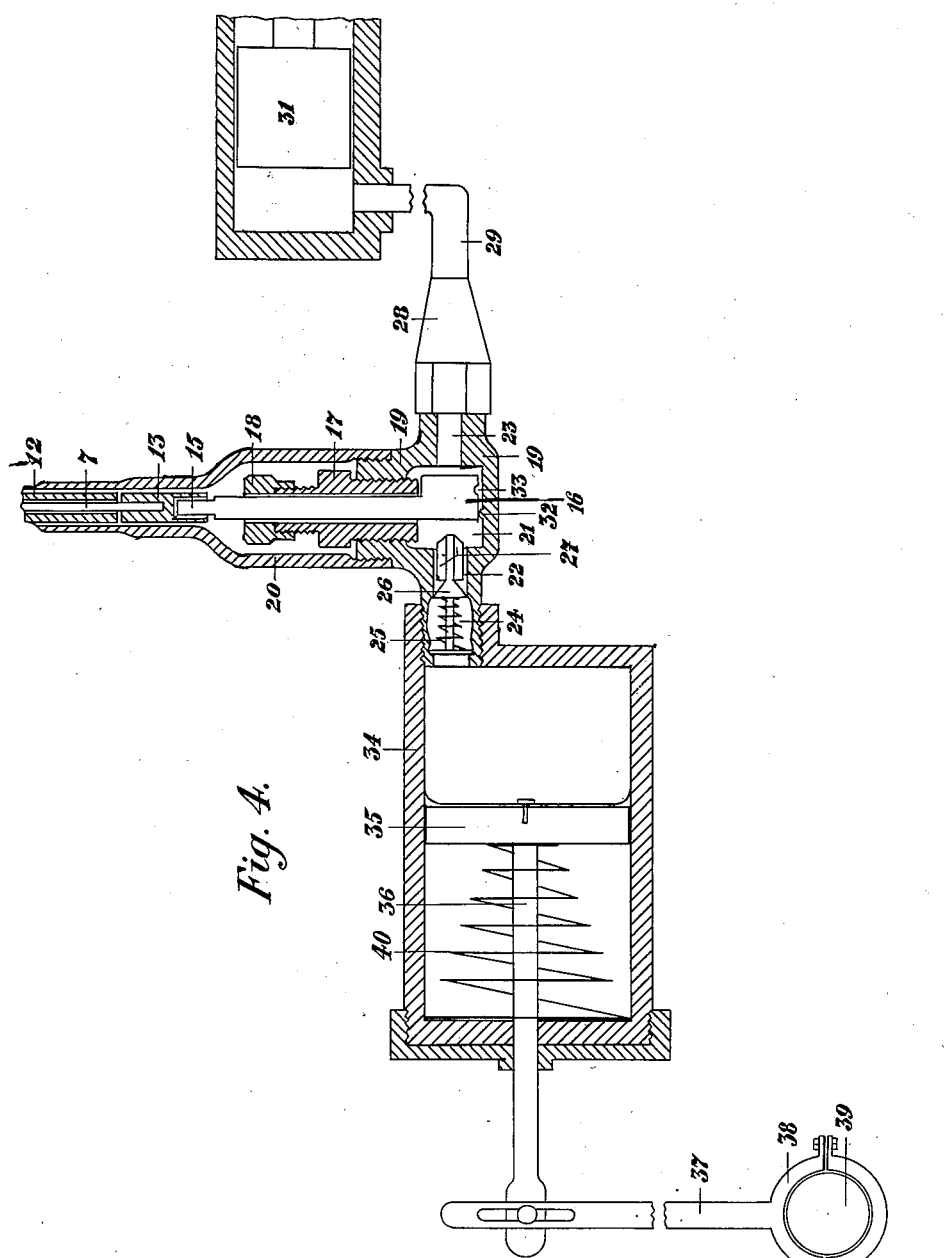
Fig. 4 is a view in section of the device of our invention showing the modification with relation to the device shown in the figure, applicable to automobiles with rod brakes.

In the drawings numeral 1 indicates a lock with its corresponding key 2 and rotating disc 3 provided with two teeth 4 each one of which is embraced in a slot 5 made in a drum 6, so that when the disc 3 rotates by means of the key 2 also the drum 6 (Figures 1 and 2) will rotate. The drum 6 is rigid with a steel wire 7 and said drum is protected by a bronze jacket 8 having its form and permitting its rotation. This jacket is fixed to the indicator board 9 of the automobile by means of a circular piece 10 (Figure 1) fixed with the screws 11. The lock 1 passes to the other side of the indicator board 9 through a circular groove thus being within reach of the person managing the automobile. The steel wire 7 is protected by a flexible steel tube 12. This wire 7, in its other end, has fixed a cylindrical piece 13 which has a square cavity 14 into which fits the part 15 whose lower end enlarges into a cylindrical eccentric valve actuator 16. The piece 15 passes through the bearing 17 and stuffing box nut 18 which permits its entrance and adjustment in head piece 19. All these latter pieces are put within the safety jacket 20 screwed to the T 19. The T 19 has four cavities: the central cavity 21 in which rotates the eccentric 16, the cavities 22 and 23 acting simultaneously as inlet and outlet of the liquid and the cavity 24 an enlarged extension of cavity 22 where the spring 25 is placed to close the valve, said spring 25 operates the valve 26 with its two guide rods 27. The eccentric 16 operates to open it. The T 19 has in its ends screw threads which will serve for receiving the nuts 28 fixed on tubes 29 and 30 for the inlet and outlet of the liquid which proceeds from the hydraulic pump 31. The T 19 has a little stop 32 which is held in the slot 33, acting as axis to the eccentric 16 for the third of a rotation which it is adapted to make.

The operation of the device described is as follows: Rotating the key 2 in position for closing the lock (Figure 1) the disc 3 will rotate which by the teeth 4 secured in the slot 5 will rotate the drum 6 and consequently the wire 7 joined to the same and in its turn the piece 13 which is connected to the other end of the wire 7 which in its turn by operating on the piece 15 will rotate the eccentric 16. The eccentric 16 when rotated (position S2 Figure 3) permits the valve 26, due to the pressure of the spring 25 to close the passage of the liquid which has passed from the hydraulic pump 31, for braking the wheels. That is at this moment when the key 2 has closed the lock 1, the automobile has its brakes locked, because although the mechanism of the hydraulic brakes is operating for disengaging the brakes of the automobile, they will not be disengaged, as the valve 26 impedes any retrocession of the liquid which is pressing the brakes of the wheels. Moreover, the more the hydraulic brake is pressed, the more the automobile will be braked as the liquid, due to the pressure from the pump 31, can pass the valve 26 but cannot go backward.

Rotating again the key 2, i. e. opening the lock 1, the eccentric 16 will press upon the guide rods 27 of valve 26 (position S1 Figure 3) and will permit the retrocession of the liquid. With the safety brake of our invention, the automobile will be then without braking and in a position to be braked and disengaged as often as it may be desired with the hydraulic brakes of the automobile.

In Figure 4 is shown the modification introduced for the application of the device for those vehicles which do not have hydraulic brakes. The pump 31 is operated directly by the pedal of the brake, sending the liquid through valve 26 in the manner previously described, into the cylinder 34 and pressing upon the piston 35 against the action of spring 40. This by means of the spindle 36 will operate the lever 37 which is rigidly joined by means of the double saddle 38 to the shaft 39 driving the rods of the brakes, which are used in all automobiles of the system having rod brakes. By means of this device our invention operates in the same manner as in the automobiles possessing hydraulic brakes.

Having thus fully described our said invention, what we claim as new and desire to secure by Letters Patent is:

1. For use in automobiles having hydraulic brake cylinders, a source of pressure and a conduit from said source of pressure leading to the brake cylinders, a safety device for locking the brakes comprising a valve in the conduit opening toward the brake cylinders, a spring tending to close said valve, an eccentrically mounted cylinder forming a valve actuator in said last named conduit said cylinder having a groove in the bottom thereof and a lug on the conduit fitting into said groove, the ends of said groove forming stops limiting the rotation of the valve actuator in both directions and the groove guiding said last named cylinder in its rotation and means extending to the exterior of said conduit to rotate said last named cylinder and to lock it against rotation whereby the valve may be locked in open position or be free to open and close.

2. The device as claimed in claim 1 in which the means for rotating the eccentrically mounted cylinder and for locking it against rotation comprises a composite stem, the one end of which extends eccentrically from one end of said last named cylinder and the upper end of which is a drum having notches, a disk having a projection entering one of said notches and a key for rotating said disk.

DOMINGO COMETTO.
JUAN COMETTO.